(12) United States Patent
He et al.

(10) Patent No.: US 7,590,116 B2
(45) Date of Patent: Sep. 15, 2009

(54) METHOD FOR FORWARDING MULTICAST MESSAGE IN NETWORK COMMUNICATION

(75) Inventors: Qiang He, Sheazhen (CN); Feng Zhang, Sheazhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 782 days.

(21) Appl. No.: 10/629,376

(22) Filed: Jul. 28, 2003

(65) Prior Publication Data

US 2004/0071137 A1    Apr. 15, 2004

(30) Foreign Application Priority Data

Aug. 6, 2002    (CN) .............................. 02 1 25420

(51) Int. Cl.
*H04L 12/28*    (2006.01)
(52) U.S. Cl. ................. 370/392; 370/432; 709/224
(58) Field of Classification Search ................. None
See application file for complete search history.

(56) References Cited

U.S. PATENT DOCUMENTS

| | | | | |
|---|---|---|---|---|
| 5,920,566 | A * | 7/1999 | Hendel et al. | 370/401 |
| 6,370,142 | B1 * | 4/2002 | Pitcher et al. | 370/390 |
| 6,567,417 | B2 * | 5/2003 | Kalkunte et al. | 370/428 |
| 6,870,840 | B1 * | 3/2005 | Hill et al. | 370/389 |
| 6,873,627 | B1 * | 3/2005 | Miller et al. | 370/466 |
| 7,039,052 | B2 * | 5/2006 | Fox et al. | 370/390 |
| 2003/0120769 | A1 * | 6/2003 | McCollom et al. | 709/224 |

FOREIGN PATENT DOCUMENTS

EP     1 035 685 A2    3/2000

OTHER PUBLICATIONS

Douglas E. Comer, Internetworking with TCP?IP Principles, Protocols, and Architecture, Fourth Edition published 1995 pp. 29-30.*
McCloqhrie, K. "*IPv4 Multicast Routing MIB*." IETF Request for Comments. Oct. 2000 Retrieved from the Internet: <URL: http://www.ietf.org/rfc/rfc2932.txt> retrieved on Dec. 12, 2003.

(Continued)

*Primary Examiner*—Robert W Wilson
(74) *Attorney, Agent, or Firm*—Merchant & Gould P.C.

(57) ABSTRACT

The invention relates to a method of forwarding multicast message in network communication. In the method: first, establish forwarding match condition at the ingress interface of the network device required to forward multicast message, the forwarding match condition specifies forwarding rule for the multicast message; then, compare the multicast message to be forwarded to network device through the interface with the forwarding match condition, and forward the multicast message according to the comparing result. The invention can configure the sending mode of messages according to requirement and can effectively avoid risks in security that may be caused by the broadcast mode for the multicast messages in the link layer as well as efficiency loss caused by receiving a great deal of invalid multicast messages, and the configuration is simple, and more convenient use and management is realized. In the present invention, forwarding multicast message according to an established multicast message forwarding rule greatly reduces the number of various multicast protocol messages generated in the multicast network and saves bandwidth resource of network.

19 Claims, 2 Drawing Sheets

OTHER PUBLICATIONS

CISCO Corp: "*IOS IP Command Reference, vol. 3: Multicast*" Retrieved from the Internet <URL: http://www.cisco.com/univercd/cc/td/d/oc/product/software/ios122cgcr/fiprmc_r/mult/lrfmulti.pdf> retrieved on Dec. 12, 2003.

Estrin D., et al. *Protocol Independent Multicast-Sparse Mode (PIM-SM): Protocol Specification*. IETF Request for Comments. Retrieved from the Internet: <URL:http://www.networksorcery.com/enp/rfc/rfc2362.txt> retrieved on Dec. 12, 2003.

CISCO Corp. "*End of Sales and Engineering for Cisco IOS Software Releases12.0T.*" Product Bulletin No. 943. Retrieved from the Internet: http://www.cisco.com/warp/public/cc/pd/iosw/iore/iomjre12/prodlit/943_pp.htm retrieved on Dec. 12, 2003.

\* cited by examiner

METHOD FOR FORWARDING MULTICAST MESSAGE IN NETWORK COMMUNICATION

BACKGROUND OF THE INVENTION

1. Field of the Invention

The present invention relates to the field of network communication technologies, more particularly to a method for forwarding multicast message in network communication.

2. Background of the Invention

With the large-scale use of meeting TV and development of IPv6, the multicast technology has been used more and more popularly. Multicast message forwarding is usually realized by IGMP (Internet Group Management Protocol) in combination with multicast routing protocol. The concrete method is to run the multicast routing protocol on every router in the multicast network, the multicast routing protocol can be any of DVMRP (Distance Vector Multicast Routing Protocol), PIM-DM (Protocol-Independent Multicast—Dense Mode), CBT (Core Broadcast Tree) or PIM-SM (Protocol-Independent Multicast—Sparse Mode). For the routers on the domain boundary and hosts that are required to join the multicast group, IGMP also has to be run. The host sends a request of joining the multicast group through IGMP, and the router connected to the host joins corresponding port of the host to a responding multicast group after receiving the request. Inside the multicast network, the multicast routing protocol forms the multicast forwarding routing table according to topology of the interface joining the multicast group. When the source port sends a message whose destination address is a multicast IP address to the multicast network, the router in multicast network forwards it according to the multicast routing table formed by the multicast routing protocol. After the message has been forwarded to the router connected to the host, the router sends the message in multicast mode to the interface where the host is connected.

In the network as shown in FIG. 1, the multicast source (Source) connects to the multicast network through Router1. Router1, through domain formed by a plurality of routers, connects to Router2 on the domain boundary. Router 2 connects to the host PC1 through Ethernet and the host PC2 is also in Ethernet. In order to correctly forward the multicast message from Source to PC1, the traditional method needs at least the following configuration: a kind of multicast routing protocol in dense or sparse mode has to be run on every router in the multicast network; router-side application of IGMP is run on the routers (Router2, Router3) on the domain boundary in the multicast network; client-side application of IGMP is run on the host requiring multicast.

After configuring as above, in order to forward the multicast messages normally, it also need the multicast routing protocol messages, transferring multicast routing information, transferred regularly between the routers in the multicast network, as well as the regular report message and the join/leave message in the announce state between the routers on the domain boundary and the host. As is shown in FIG. 1, first, PC1 sends the join message to Router2 for applying for joining in the multicast group, Router2 joins the Ethernet interface that PC1 corresponds to in the multicast group, and the join message propagates in the whole multicast network through multicast routing protocol messages, and forms the multicast routing information which can be used to send the message to the bearer multicast message interface. In this way, when Source sends a multicast message meeting requirements through Router1, the forwarded messages through the multicast network are sent to Router2 on the domain boundary, and Router2 sends the multicast message to the Ethernet interface connected to PC1, which receives the message.

Seen from conventional technical scheme, conventional multicast routing forwarding method has the following problems: first, it lowers the security of IP message, the security is not very high originally. When the router sends a multicast message to the used host, IGMP sends message from the interface in multicast mode, while in broadcast-type networks (such as Ethernet), this sending mode will cause the problem that the message is sent to the host which should not receive it originally. As is shown in FIG. 1, host PC2 can also receive the multicast message intended for PC1. This mechanism sometimes restrains the application of multicast to a great extent. Second, the inconvenience of the traditional method lies further in the fact that the network configuration is quite troublesome, there are various configurations for hosts, routers on the boundary and forwarding routers and it involves client-side application and the router-side application of the multicast routing protocol and IGMP, demanding a higher qualification from the network administrator. Third, running the multicast routing protocol on all routers will affect the forwarding efficiency of the routers and increase the burden on the routers and hosts in the multicast network. Fourth, a great deal of multicast protocol messages generated between routers and between hosts and routers in the multicast network occupy precious bandwidth resource.

SUMMARY OF THE INVENTION

Object of the present invention is to provide a method of forwarding multicast message in network communication, which guarantees the security in multicast message forwarding, makes configuration of the multicast network simpler, saves bandwidth resource and increases forwarding efficiency of the routers.

The object of the present invention is realized as the following. Said method of forwarding multicast message in network communication comprises:

a. establish forwarding match condition at the ingress interface of the network device required to forward multicast message, the forwarding match condition specifies forwarding rule for the multicast message;

b. compare the multicast message to be forwarded to network device through the interface with the forwarding match condition;

c. forward the multicast message according to the comparing result.

Said forwarding match condition is a multicast message forwarding rule group consisting of more than one multicast message forwarding rule.

Said step b comprises:

b1. determine whether the message entering through this interface is a multicast message;

b2. if the message entering through this interface is a multicast message, compare the multicast message with individual multicast message forwarding rule contained in the forwarding match condition;

b3. if the message entering through this interface is not a multicast message, forward the message in unicast mode.

In said step b2: compare the source address information in the multicast message with the source address information in the multicast message forwarding rule.

In said step b2: compare the source address and destination address information in the multicast message with the source address and destination address information in the multicast message forwarding rule.

In said step b2: compare the ingress interface information in the multicast message with the ingress interface information in the multicast message forwarding rule.

Said step b2 comprises:

b21. determine whether there is a multicast message forwarding rule established at the interface of the network device;

b22. if there is a multicast message forwarding rule established at the interface of the network device, compare the information carried by the multicast message with corresponding information in the multicast message forwarding rule;

b23. if no multicast message forwarding rule is established at the interface of the network device, forward the multicast message according to the multicast routing forwarding table.

Said step c comprises:

c1. determine whether there is a multicast message forwarding rule matching the information carried by the multicast message in the forwarding match condition;

c2. if there is a multicast message forwarding rule matching the information carried by the multicast message in the forwarding match condition, forward the multicast message according to the multicast message forwarding rule;

c3. if no multicast message forwarding rule in the forwarding match condition matches the information carried by the multicast message, forward the multicast message according to the multicast routing forward table.

In said step c2:

c21. determine whether the message forwarding destination specified in the multicast message forwarding rule is a forwarding egress interface or a next hop address;

c22. if the destination is a forwarding egress interface, and if the message is configured with a plurality of forwarding egress interfaces, the message is forwarded to all the forwarding egress interfaces after copied;

c23. if the destination is a next hop address, forward the message according to the unicast routing forwarding table and if the message is configured with a plurality of next hop addresses, the message is forwarded to all the next hop addresses after copied.

Said step c23 comprises:

c231. search the unicast routing forwarding table and determine the type of egress interface corresponding to the next hop address;

c232. if the type of egress interface is NBMA (Non-Broadcast Multiple Access, i.e. point to multipoint), forward the message according to the egress interface;

c233. if the type of egress interface is broadcast, forward the message according to the next hop address in the unicast routing forwarding table and set the property of the message as unicast message;

C234. if the type of egress interface is PTP (Point To Point), directly forward the message according to the next hop address specified in the multicast message forwarding rule.

Seen from the above technical solution, in the present invention, the multicast message forwarding rule group designed for forwarding multicast message enables to flexibly configure the Access Control List (ACL) to realize the function of packet filter required by users, that is, to realize sending the multicast message in a multicast mode according to the interface or in a unicast mode according to the next hop address, as required by the users. The present invention has the following advantages in the control method of forwarding multicast message: first, in the present invention, the mode of sending message can be configured according to requirement and can effectively avoid efficiency loss caused by receiving a great deal of invalid multicast messages and the security risk which may be caused by efficiency loss; second, implementing the present invention does not need to configure IGMP on the host, which enables more convenient use and management for users; third, in the present invention, a multicast message is forwarded according to an established multicast message forwarding rule, such a configuration can replace functions of IGMP and the multicast routing protocol, therefore the number of various multicast protocol messages generated in the multicast network is greatly reduced and network bandwidth is saved.

DETAILED DESCRIPTION OF THE EMBODIMENT

The method of forwarding multicast message in network communication according to the present invention can be both an independent mode of forwarding multicast message and an extension to the conventional mode of forwarding multicast message. In this method, a multicast message can be forwarded according to the specific multicast message forwarding rule designated by users but no longer search the multicast routing able only; the multicast message forwarding rule is the rule, specifying the mode of forwarding multicast message, confirmed and input by users according to their requirement. The present invention enables users to flexibly establish the multicast message forwarding rule according to requirement during networking, and provides great flexibility, expandability and good compatibility for users.

Figure 1:
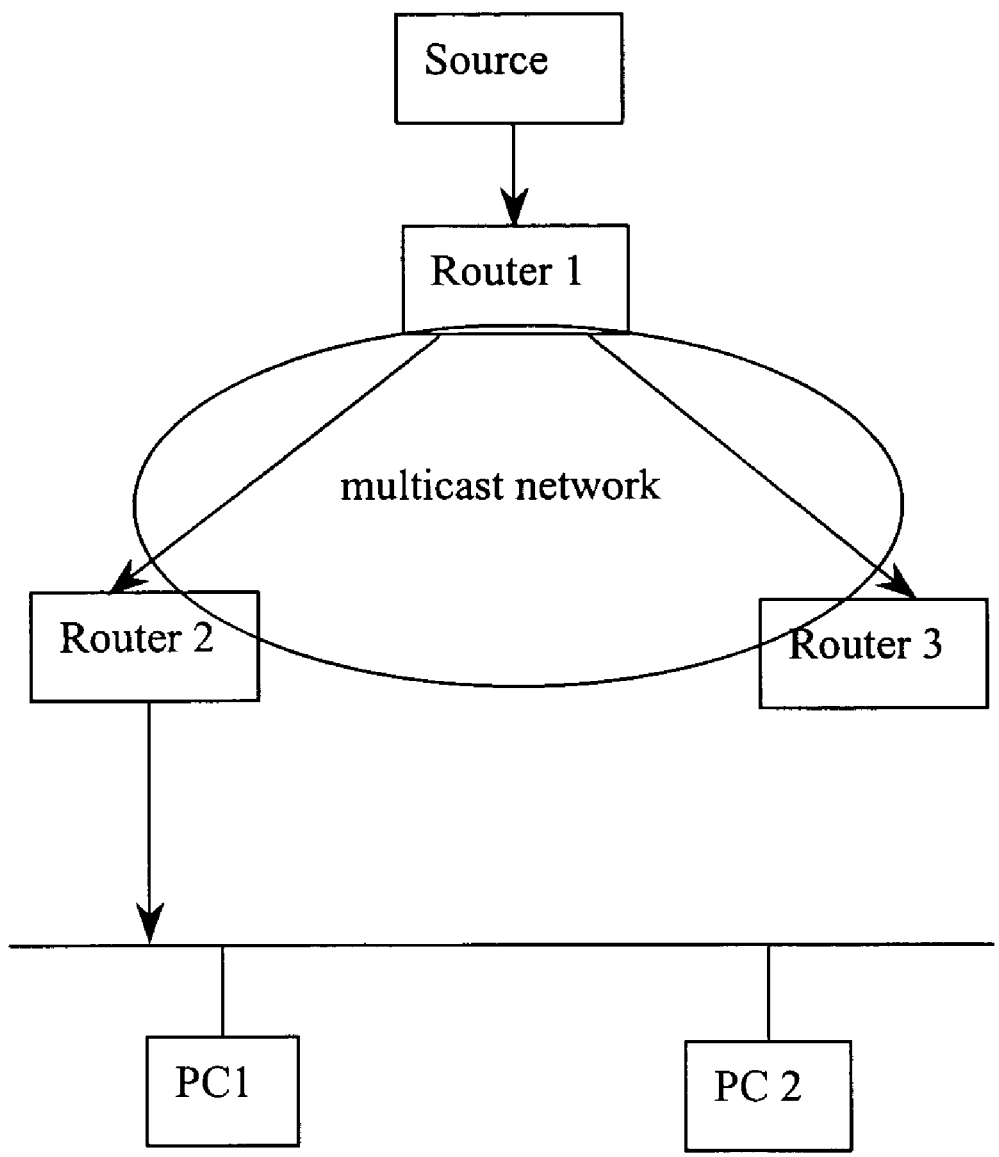
FIG. 1 is the structural diagram of the multicast network.
Figure 2:
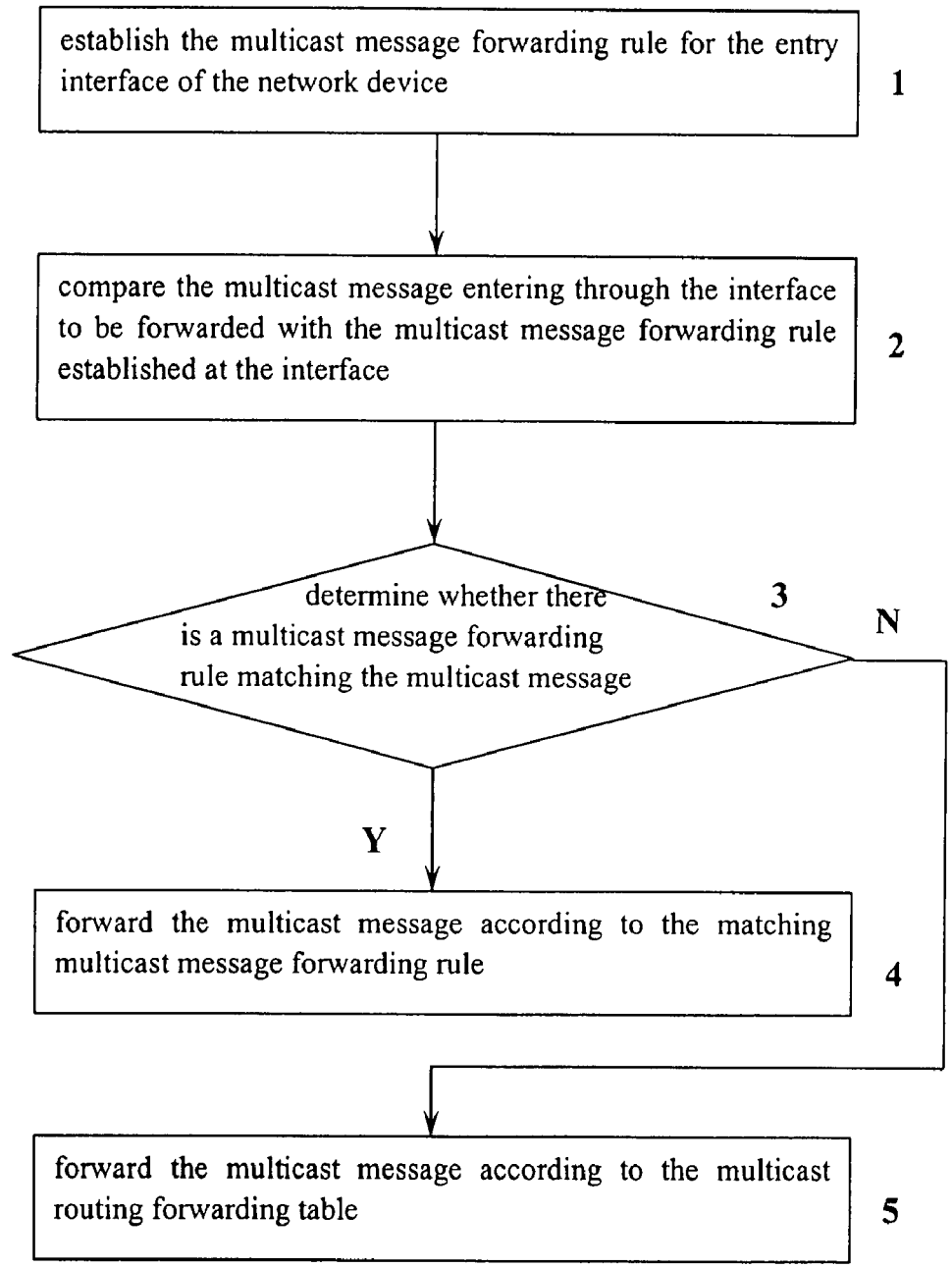
FIG. 2 is the flowchart of concrete implementation according to the present invention.

Embodiment of the present invention will be described according to FIG. 2.

Step 1: Users establish the multicast message forwarding rule at the ingress interface of corresponding router according to their requirement. The multicast message forwarding rule can contain only one rule or a multicast message forwarding rule group consisting of a plurality of rules.

One or more multicast message forwarding rules can exist at a certain ingress interface on the network device namely the router. Every multicast message forwarding rule group is a relatively independent forwarding control policy, specifying necessary condition for forwarding multicast message according to corresponding multicast message forwarding rule. Every message entering the router through this interface to be forwarded shall be compared with the condition. If the multicast message meets the description of a certain feature in the condition, that is, matches the condition, then the message is forwarded in a mode of forwarding multicast message corresponding to the condition. The mode is in the multicast message forwarding rule, and the mode of forwarding multicast message in the multicast message forwarding rule describes in detail the forwarding scheme for the message and takes over the subsequent forwarding.

Said necessary condition for multicast forwarding message according to the multicast message forwarding rule can be described with the source address information, destination address information or ingress interface information in the multicast message, while the corresponding mode of forwarding multicast message in the multicast message forwarding rule can be described with egress interface information or next hop address information in the multicast message.

Step 2: compare the information carried in the multicast message entering the router with corresponding information in the multicast message forwarding rule to determine mode of forwarding multicast message.

After establishing the multicast message forwarding rule at an interface of the router, all the multicast messages entering the router through the interface to be forwarded will be filtered and the multicast messages and multicast protocol messages reaching the local end will not be filtered; in the method of filtering: all the multicast message forwarding rules established at the interface are compared with corresponding information in the multicast message in an order of from higher to lower priority level designated during establishing.

Step 3: determine whether there is multicast message forwarding rule matching the multicast message, if there is a multicast message forwarding rule matching the multicast message, perform step 4, otherwise perform step 5.

During the process of filtering, if the multicast message matches a certain multicast message forwarding rule, stop the process of filtering and perform step 4; otherwise, proceed with the process of filtering, that is, to compare the multicast message with the next multicast message forwarding rule until all multicast message forwarding rules have been compared with the multicast message. If the multicast message does not match any of the multicast message forwarding rules, it will return to the normal flow of forwarding multicast to process, that is, to perform step 5.

Therefore, the present invention not only supports establishing a multicast message forwarding rule at the interface, but also supports establishing several multicast message forwarding rules at the interface.

In the present invention, a certain multicast message forwarding rule can contain one or more modes of forwarding multicast message and can support different types of modes of forwarding multicast message, for instance, there may exist configurations for an egress interface and a next hop at the same time, therefore the present invention has stronger function and more convenient application.

Step 4: forward the message according to the matching multicast message forwarding rule.

For configurations of different types of modes of forwarding multicast message, the present invention provides forwarding modes adapted to features of network to guarantee the security of forwarding multicast message in the network. Now implementation in different networks will be described as the following by taking an example of configuring egress interface and next hop.

If a plurality of forwarding egress interfaces are configured in the mode of forwarding multicast message according to a multicast message forwarding rule, the message will be copied and forwarded to all designated interfaces. This mode provides the lowest security level for the multicast message forwarding.

If next hop IP addresses are configured in the mode of forwarding multicast message according to a multicast message forwarding rule, the local IP address therein will not be processed. For all valid opposite-end IP addresses, the unicast routing table will be searched. If there is no route, they will not be processed; if some route is found, they will be processed according to types of the egress interfaces in the routing items as follows:

if the type of the egress interface is NBMA (point to multipoint), forward the message according to the egress interface and virtual circuit therein;

if the type of the egress interface is broadcast (Ethernet); forward the message according to the next hop address found in the unicast routing table and set the property of the message as unicast message;

if the type of the egress interface is PTP, forward the message directly according to the IP address configured in the policy routing, wherein the IP address acts as the next hop address;

if there is no egress interface or next hop IP address configured, do not process the message and discard it directly.

Users can choose from different configuring modes of multicast message forwarding rule according to different requirements for security level.

Step 5: forward the multicast message according to the multicast routing forwarding table. The forwarding process is the same as conventional one and will not be discussed here.

The multicast message forwarding rule established in the present invention mainly works in IP layer and has no special requirements for the link layer protocol. Therefore, establishing the rule can be based on kinds of link layer protocols such as Ethernet, PPP (Point-to-Point Protocol), ATM (Asynchronous Transfer Mode), Frame Relay, etc. and it is convenient for users.

For some small-scale or relatively fixed networks, only simple multicast message forwarding rule need to be established to control the multicast message forwarding to reduce extra cost in the system and to promote efficiency of forwarding and to effectively guarantee the security of forwarding multicast message.

What is claimed is:

1. A method for forwarding multicast message in network communication comprising:
   a. establishing a forwarding match condition at an ingress interface of a network device required to forward multicast message, the forwarding match condition specifying a multicast message forwarding rule designated by a user for multicast message independently of a multicast routing forwarding table, the multicast message forwarding rule having a message forwarding destination specified therein;
   b. comparing a multicast message which enters the network device through the interface and needs to be forwarded with the established forwarding match condition;
   c. forwarding the multicast message according to the comparing result,
   wherein said step c comprises:
   c1. determining whether there is a multicast message forwarding rule matching information carried by the multicast message in the forwarding match condition;
   c2. if there is a multicast message forwarding rule matching the information carried by the multicast message in the forwarding match condition, forwarding the multicast message according to the multicast message forwarding rule;
   c3. if no multicast message forwarding rule in the forwarding match condition matches the information carried by the multicast message, forwarding the multicast message according to a multicast routing forwarding table.

2. A method for forwarding multicast message in network communication of claim 1, wherein said forwarding match condition is a multicast message forwarding rule group consisting of more than one multicast message forwarding rule.

3. A method for forwarding multicast message in network communication of claim 2, wherein said step b comprises:
   b1. determining whether the message entering through the interface is a multicast message;

b2. if the message entering through the interface is a multicast message, comparing the multicast message with individual multicast message forwarding rules contained in the forwarding match condition;

b3. if the message entering through the interface is not a multicast message, forwarding the message in unicast mode.

4. A method for forwarding multicast message in network communication of claim 3, wherein said step b2 comprises step of comparing source address information in the multicast message with source address information in the multicast message forwarding rule.

5. A method for forwarding multicast message in the network communication of claim 4, where said step c2 comprises:

c21. determining whether the message forwarding destination specified in the multicast message forwarding rule is a forwarding egress interface or a next hop address;

c22. if the destination is a forwarding egress interface, and if the message is configured with a plurality of forwarding egress interfaces, forwarding the message to all the forwarding egress interfaces after copying it;

c23. if the destination is a next hop address, forwarding the message according to a unicast routing forwarding table and if the message is configured with a plurality of next hop addresses, forwarding the message to all the next hop addresses after copying it.

6. A method for forwarding multicast message in network communication of claim 5, wherein said step c23 comprises:

c231. searching the unicast routing forwarding table and determining the type of egress interface corresponding to the next hop address;

c232. if the type of egress interface is NBMA (point to multipoint), forwarding the message according to the egress interface;

c233. if the type of egress interface is broadcast, forwarding the message according to the next hop address in the unicast routing forwarding table and setting the property of the message as unicast message;

c234. if the type of egress interface is PTP, directly forwarding the message according to the next hop address specified in the multicast message forwarding rule.

7. A method for forwarding multicast message in network communication of claim 3, wherein said step b2 comprises step of comparing source address and destination address information in the multicast message with source address and destination address information in the multicast message forwarding rule.

8. A method for forwarding multicast message in network communication of claim 7, wherein said step c2 comprises:

c21. determining whether the message forwarding destination specified in the multicast message forwarding rule is a forwarding egress interface or a next hop address;

c22. if the destination is a forwarding egress interface, and if the message is configured with a plurality of forwarding egress interfaces, forwarding the message to all the forwarding egress interfaces after copying it;

c23. if the destination is a next hop address, forwarding the message according to a unicast routing forwarding table and if the message is configured with a plurality of next hop addresses, forwarding the message to all the next hop addresses after copying it.

9. A method for forwarding multicast message in network communication of claim 8, wherein said step c23 comprises:

c231. searching the unicast routing forwarding table and determining the type of egress interface corresponding to the next hop address;

c232. if the type of egress interface is NBMA (point to multipoint), forwarding the message according to the egress interface;

c233. if the type of egress interface is broadcast, forwarding the message according to the next hop address in the unicast routing forwarding table and setting the property of the message as unicast message;

c234. if the type of egress interface is PTP, directly forwarding the message according to the next hop address specified in the multicast message forwarding rule.

10. A method for forwarding multicast message in network communication of claim 3, wherein said step b2 comprises step of comparing ingress interface information in the multicast message with ingress interface information in the multicast message forwarding rule.

11. A method for forwarding multicast message in network communication of claim 10, wherein said step c2 comprises:

c21. determining whether the message forwarding destination specified in the multicast message forwarding rule is a forwarding egress interface or a next hop address;

c22. if the destination is a forwarding egress interface, and if the message is configured with a plurality of forwarding egress interfaces, forwarding the message to all the forwarding egress interfaces after copying it;

c23. if the destination is a next hop address, forwarding the message according to a unicast routing forwarding table and if the message is configured with a plurality of next hop addresses, forwarding the message to all the next hop addresses after copying it.

12. A method for forwarding multicast message in network communication of claim 11, wherein said step c23 comprises:

c231. searching the unicast routing forwarding table and determining the type of egress interface corresponding to the next hop address;

c232. if the type of egress interface is NBMA (point to multipoint), forwarding the message according to the egress interface;

c233. if the type of egress interface is broadcast, forwarding the message according to the next hop address in the unicast routing forwarding table and setting the property of the message as unicast message;

c234. if the type of egress interface is PTP, directly forwarding the message according to the next hop address specified in the multicast message forwarding rule.

13. A method for forwarding multicast message in network communication of claim 3, wherein said step b2 comprises:

b21. determining whether there is a multicast message forwarding rule established at the interface of the network device;

b22. if there is a multicast message forwarding rule established at the interface of the network device, comparing information carried by the multicast message with corresponding information in the multicast message forwarding rule;

b23. if no multicast message forwarding rule is established at the interface of the network device, forwarding the multicast message according to a multicast routing forwarding table.

14. A method for forwarding multicast message in network communication of claim 13, wherein said step c2 comprises:

c21. determining whether the message forwarding destination specified in the multicast message forwarding rule is a forwarding egress interface or a next hop address;

c22. if the destination is a forwarding egress interface, and if the message is configured with a plurality of forwarding egress interfaces, forwarding the message to all the forwarding egress interfaces after copying it;

c23. if the destination is a next hop address, forwarding the message according to a unicast routing forwarding table and if the message is configured with a plurality of next hop addresses, forwarding the message to all the next hop addresses after copying it.

15. A method for forwarding multicast message in network communication of claim 14, wherein said step c23 comprises:

c231. searching the unicast routing forwarding table and determining the type of egress interface corresponding to the next hop address;

c232. if the type of egress interface is NBMA (point to multipoint), forwarding the message according to the egress interface;

c233. if the type of egress interface is broadcast, forwarding the message according to the next hop address in the unicast routing forwarding table and setting the property of the message as unicast message;

c234. if the type of egress interface is PTP, directly forwarding the message according to the next hop address specified in the multicast message forwarding rule.

16. A method for forwarding multicast message in network communication of claim 3, wherein said step c2 comprises:

c21. determining whether the message forwarding destination specified in the multicast message forwarding rule is a forwarding egress interface or a next hop address;

c22. if the destination is a forwarding egress interface, and if the message is configured with a plurality of forwarding egress interfaces, forwarding the message to all the forwarding egress interfaces after copying it;

c23. if the destination is a next hop address, forwarding the message according to a unicast routing forwarding table and if the message is configured with a plurality of next hop addresses, forwarding the message to all the next hop addresses after copying it.

17. A method for forwarding multicast message in network communication of claim 16, wherein said step c23 comprises:

c231. searching the unicast routing forwarding table and determining the type of egress interface corresponding to the next hop address;

c232. if the type of egress interface is NBMA (point to multipoint), forwarding the message according to the egress interface;

c233. if the type of egress interface is broadcast, forwarding the message according to the next hop address in the unicast routing forwarding table and setting the property of the message as unicast message;

c234. if the type of egress interface is PTP, directly forwarding the message according to the next hop address specified in the multicast message forwarding rule.

18. A method for forwarding multicast message in network communication of claim 1, wherein said step c2 comprises:

c21. determining whether the message forwarding destination specified in the multicast message forwarding rule is a forwarding egress interface or a next hop address;

c22. if the destination is a forwarding egress interface, and if the message is configured with a plurality of forwarding egress interfaces, forwarding the message to all the forwarding egress interfaces after copying it;

c23. if the destination is a next hop address, forwarding the message according to a unicast routing forwarding table and if the message is configured with a plurality of next hop addresses, forwarding the message to all the next hop addresses after copying it.

19. A method for forwarding multicast message in network communication of claim 18, wherein said step c23 comprises:

c231. searching the unicast routing forwarding table and determining the type of egress interface corresponding to the next hop address;

c232. if the type of egress interface is NBMA (Non-Broadcast Multiple Access, i.e. point to multipoint), forwarding the message according to the egress interface;

c233. if the type of egress interface is broadcast, forwarding the message according to the next hop address in the unicast routing forwarding table and setting the property of the message as unicast message;

c234. if the type of egress interface is PTP (Point To Point), directly forwarding the message according to the next hop address specified in the multicast message forwarding rule.

\* \* \* \* \*